(12) United States Patent
Mukherjee (10) Patent No.: US 10,827,394 B2
(45) Date of Patent: Nov. 3, 2020

(54) TRIGGERING SELECTIVE FALLBACK BASED ON USER SUBSCRIPTION INFORMATION

(71) Applicant: Cisco Technology, Inc., San Jose, CA (US)

(72) Inventor: Subrata Mukherjee, Plano, TX (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 17 days.

(21) Appl. No.: 16/219,400

(22) Filed: Dec. 13, 2018

(65) Prior Publication Data

US 2020/0120551 A1  Apr. 16, 2020

Related U.S. Application Data

(60) Provisional application No. 62/745,090, filed on Oct. 12, 2018.

(51) Int. Cl.
*H04W 36/00* (2009.01)
*H04W 48/18* (2009.01)
(Continued)

(52) U.S. Cl.
CPC ..... *H04W 36/0022* (2013.01); *H04L 65/1069* (2013.01); *H04W 8/04* (2013.01); *H04W 8/08* (2013.01); *H04W 36/26* (2013.01); *H04W 36/36* (2013.01); *H04W 48/18* (2013.01); *H04W 80/10* (2013.01)

(58) Field of Classification Search
None
See application file for complete search history.

(56) References Cited

U.S. PATENT DOCUMENTS

| 6,282,192 B1 | 8/2001 | Murphy et al. |
| 9,930,578 B2 | 3/2018 | Vashi et al. |

(Continued)

FOREIGN PATENT DOCUMENTS

WO   2018006017 A1   1/2018

OTHER PUBLICATIONS

"5G; System Architecture for the 5G System", 3GPP TS 23.501 version 15.2.0 Release 15, ETSI TS 123 501 v15.2.0. Jun. 2018, pp. 141-150.

(Continued)

*Primary Examiner* — Brian S Roberts (57) ABSTRACT

In one embodiment, a method includes: obtaining a RAN preference indicator from an operator indicating whether to use the first RAN or a second RAN for a specified data flow type for a particular user device, wherein the RAN preference indicator is based on subscriber information associated with a user of the particular user device; determining whether to transmit the data flow via the first RAN or the second RAN based on the RAN preference indicator; causing the data flow to be transmitted via the first RAN according to a determination that the RAN preference indicator indicates that the specified data flow type should be transmitted via the first RAN; and causing the data flow to be transmitted via the second RAN according to a determination that the RAN preference indicator indicates that the specified data flow type should be transmitted via the second RAN.

20 Claims, 8 Drawing Sheets

(51) Int. Cl.
  *H04L 29/06* (2006.01)
  *H04W 8/04* (2009.01)
  *H04W 36/36* (2009.01)
  *H04W 36/26* (2009.01)
  *H04W 8/08* (2009.01)
  *H04W 80/10* (2009.01)

(56) References Cited

U.S. PATENT DOCUMENTS

| | | | |
|---|---|---|---|
| 2009/0258671 A1* | 10/2009 | Kekki | H04W 76/18 455/552.1 |
| 2011/0244874 A1* | 10/2011 | Fodor | H04W 48/18 455/450 |
| 2013/0311667 A1* | 11/2013 | Payette | H04L 67/14 709/228 |
| 2014/0082697 A1* | 3/2014 | Watfa | H04W 76/15 726/3 |
| 2015/0358884 A1* | 12/2015 | Nagasaka | H04W 48/18 370/230 |
| 2016/0029295 A1* | 1/2016 | Nagasaka | H04W 48/18 370/237 |
| 2016/0057678 A1* | 2/2016 | Salkintzis | H04W 48/12 370/230 |
| 2016/0198399 A1* | 7/2016 | Kim | H04W 48/18 455/435.2 |
| 2016/0234751 A1* | 8/2016 | Golaup | H04W 36/0072 |
| 2016/0373275 A1* | 12/2016 | Al-Asaaed | H04L 12/4641 |
| 2017/0099600 A1 | 4/2017 | Jeong et al. | |
| 2020/0015128 A1* | 1/2020 | Stojanovski | H04W 76/25 |

OTHER PUBLICATIONS

3GPP Organizational Partners, "3rd Generation Partnership Project; Technical Specification Group Services and System Aspects; Procedures for the 5G System; Stage 2 (Release 15)", 3GPP TS 21502 V15.3.0, Sep. 2018, 330 pages.

* cited by examiner

TRIGGERING SELECTIVE FALLBACK BASED ON USER SUBSCRIPTION INFORMATION

CROSS-REFERENCE TO RELATED APPLICATION

This application claims priority to U.S. Provisional Patent App. No. 62/745,090, filed on Oct. 12, 2018, which is hereby incorporated by reference in its entirety.

TECHNICAL FIELD

The present disclosure generally relates to managing communications on different radio access networks and, in particular, to systems, methods, and devices for determining whether to use a particular radio access network for a data flow associated with a user.

BACKGROUND

Current proposed 5G standards dictate that either all calls or no calls are subject to an evolved packet system (EPS) (e.g., long-term evolution (LTE)/4G system) fallback (or handover) for IP Multimedia Subsystem (IMS) voice during the voice call establishment in 5G. This is similar to existing LTE/4G networks where IMS voice is handed over from the LTE/4G network to the 3G network. For example, when a user attempts a voice call via IMS voice on user equipment (UE) connected to a 5G core (e.g., a session management function (SMF)), the call will be handed over to EPS during establishment of the voice call. As such, the current proposed 5G standards describe an "all or nothing" approach with no mechanism to support selective EPS fallback for IMS voice (or other data flows) based on user profile or preference.

BRIEF DESCRIPTION OF THE DRAWINGS

So that the present disclosure can be understood by those of ordinary skill in the art, a more detailed description may be had by reference to aspects of some illustrative embodiments, some of which are shown in the accompanying drawings.

In accordance with common practice, the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DESCRIPTION OF EXAMPLE EMBODIMENTS

Numerous details are described in order to provide a thorough understanding of the illustrative embodiments shown in the accompanying drawings. However, the accompanying drawings merely show some example aspects of the present disclosure and are therefore not to be considered limiting. Those of ordinary skill in the art will appreciate from the present disclosure that other effective aspects and/or variants do not include all of the specific details of the example embodiments described herein. While pertinent features are shown and described, those of ordinary skill in the art will appreciate from the present disclosure that various other features, including well-known systems, methods, components, devices and circuits have not been illustrated or described in exhaustive detail for the sake of brevity and so as not to obscure more pertinent aspects of the example embodiments described herein.

Overview

Various embodiments disclosed herein include methods, devices, and systems for determining whether to use a first radio access network (RAN) or a second RAN for a data flow associated with a user. For example, in various embodiments, a method is performed by a node managing a first RAN associated with a plurality of user devices. In various embodiments, the node includes one or more processors, and a non-transitory memory. In various embodiments, the method includes obtaining a RAN preference indicator from an operator indicating whether to use the first RAN or the second RAN for a specified data flow type for a particular user device, wherein the RAN preference indicator is based on subscriber information associated with a user of the particular user device. In some embodiments, the method includes determining whether to transmit the data flow that corresponds to the specified data flow type for the particular user device via the first RAN or the second RAN based on the RAN preference indicator for the particular user device. In some embodiments, the method includes causing the data flow to be transmitted to the particular user device via the first RAN according to a determination that the RAN preference indicator for the particular user device indicates that the specified data flow type should be transmitted via the first RAN. In some embodiments, the method includes causing the data flow to be transmitted to the particular user device via the second RAN according to a determination that the RAN preference indicator for the particular user device indicates that the specified data flow type should be transmitted via the second RAN.

In accordance with some embodiments, a device includes one or more processors, a non-transitory memory, and one or more programs; the one or more programs are stored in the non-transitory memory, which, when executed by the one or more processors, cause the device to perform or cause performance of any of the methods described herein. In accordance with some embodiments, a non-transitory memory has stored therein instructions, which, when executed by one or more processors of a device, cause the device to perform or cause performance of any of the methods described herein. In accordance with some embodiments, a device includes: one or more processors, a non-transitory memory, and means for performing or causing performance of any of the methods described herein.

Example Embodiments

Some implementations allow a 5G core to indicate to a radio node via an access mobility function (AMF) whether or not a communication (e.g., IMS voice) is subject to an EPS fallback (e.g., LTE/4G network). To this end, subscription information associated with user equipment (UE) includes an attribute about whether EPS fallback for IMS voice should be performed on a per user or per call basis. As a result, after a voice call is being established and verified, the radio node can determine whether the voice call will be handled in a 5G or LTE/4G access network based on user subscription information obtained during a session establishment phase.

Figure 1A:
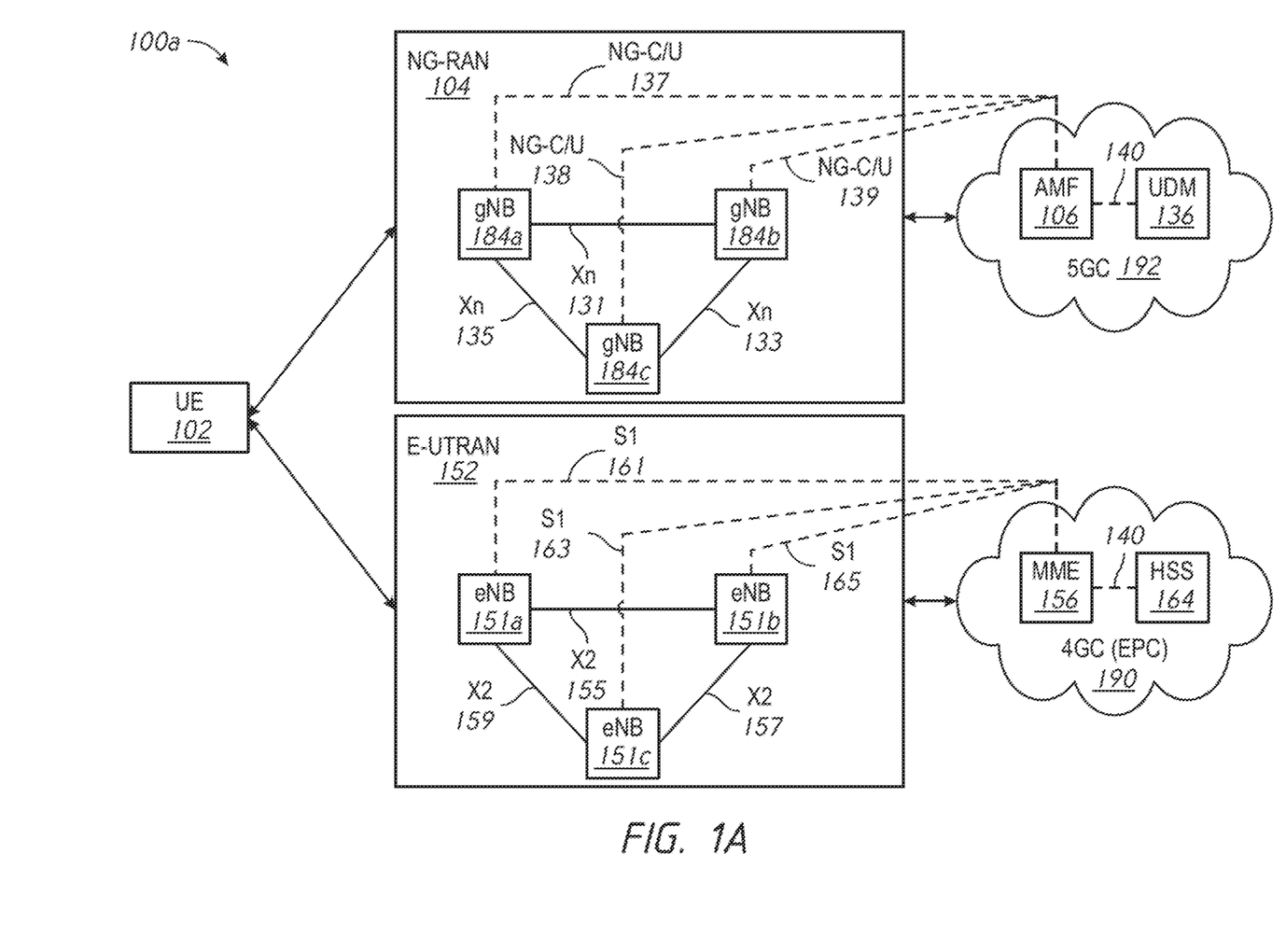
FIG. 1A is a diagram that illustrates an example network environment in accordance with some embodiments.

FIG. 1A illustrates an example network architecture 100a in accordance with some embodiments. Specifically, FIG. 1A shows an example network architecture including a UE 102 with options to connect to a 4G Core (Evolved Packet Core (EPC)) 190 and a 5G-Core (5GC) 192 networks. While pertinent features are shown, those of ordinary skill in the art will appreciate from the present disclosure that various other features have not been illustrated for the sake of brevity and so as not to obscure more pertinent aspects of the example implementations disclosed herein. To that end, the network architecture 100a includes a Next Generation radio-access-network (NG-RAN) 104 (e.g., a first radio access network (RAN) associated with 5G radio access technology (RAT)) with connection to the 5GC 192, a unified data management (UDM) 136, an evolved universal terrestrial radio access network (E-UTRAN) 152 (e.g., a second RAN associated with LTE/4G RAT) with connection to the 4GC (EPC) 190, and a Home Subscriber Server (HSS) 164.

The UE 102 may gain access to the 4GC (EPC) 190 via the E-UTRAN 152 or the 5GC 192 via NG-RAN 104. The UE 102 may be any suitable type of device, such as a cellular telephone, a smart phone, a tablet device, an Internet of Things (IoT) device, a machine-to-machine (M2M) device, or the like.

The NG-RAN 104 includes a plurality of next generation NodeBs (gNBs) (e.g., gNB 184a, gNB 184b, and gNB 184c) that are interconnected via Xn interfaces 131, 133, and Xn 135. The Xn interfaces (e.g., Xn interface 131, Xn interface 133, and Xn interface 135) are logical interfaces that inter-connect gNB to gNB. The gNBs provide next generation user plane and control plane protocol terminations towards the UE 102. The distributed gNB architecture supports the mechanism of centralized retransmission of lost Protocol Data Units (PDUs) that provide means to mitigate the link outage between one of the distributed units and mobile user equipment. The plurality of gNBs (e.g., gNB 184a, gNB 184b, and gNB 184c) also communicate with the AMF 106 via Next Generation Control/User Plane (NG-C/U) interfaces 137, 139, and 138, respectively.

The AMF 106 may provide mobility management, access authentication and/or authorization, and/or a security anchor function. The AMF 106 may also provide security context management. The AMF 106 may provide a transparent proxy for routing access authentication messages. The AMF 106 may provide an interface for lawful intercept functions. The AMF 106 also plays a role in handover signaling between 5G and 4G networks. The AMF 106 may communicate to the UDM 136 via a N8 interface 140.

The UDM 136 is associated with an operator that includes, for example, information about subscriber devices and associated subscriber. In some embodiments, the UDM 136 correlates subscriber identity module (SIM) or international mobile equipment identifier (IMEI) information associated with a specific user device (e.g., a mobile phone such as the UE 102) to a particular user with a subscription plan associated with the operator. The UDM 136 may support an authentication credential repository and processing function for NG-RAN 104. This function may store long-term security credentials that may be used in authentication.

The E-UTRAN 152 includes a plurality of evolved NodeBs (eNBs) (e.g., eNB 151a, eNB 151b, and eNB 151c) that are interconnected via X2 interfaces 155, 157, and 159. The plurality of eNBs (e.g., eNB 151a, eNB 151b, and eNB 151c) correspond to base stations that manage radio resource and mobility in the cell and sector to optimize all the UE communications in a flat radio network structure. The X2 interfaces are defined between eNBs and minimizes packet loss due to user mobility. As a UE moves across an access network, unsent or unacknowledged packets stored in the old eNB queues can be forwarded or tunneled to the new eNB by the X2 interface. The plurality of eNBs (e.g., eNB 151a, eNB 151b, and eNB 151c) also communicate with the HSS 164 via S1 interfaces 161, 165, and 163, respectively, though a mobility management entity (MME) 156.

The MME 156 is responsible for initiating paging and authentication of the UE device 102. The MME 156 may also retain location information at the tracking area level for each user and then selects an appropriate gateway during the initiate registration process. The MME 156 also plays a role in handover signaling between 4G and 5G networks as well as between 4G and 2G/3G networks. The MME 156 may communicate with the HSS 164 using S6a 182.

The HSS 164 is a concatenation of the Home Subscriber Services (HSS) and the Authentication Center (AuC). The HSS portion of the HSS 164 manages the storing and updating of the database containing all the user subscription information including at least user identification and addressing and user profile information. The AuC portion of the HSS 164 manages the generation of security information from user identity keys.

Figure 1B:
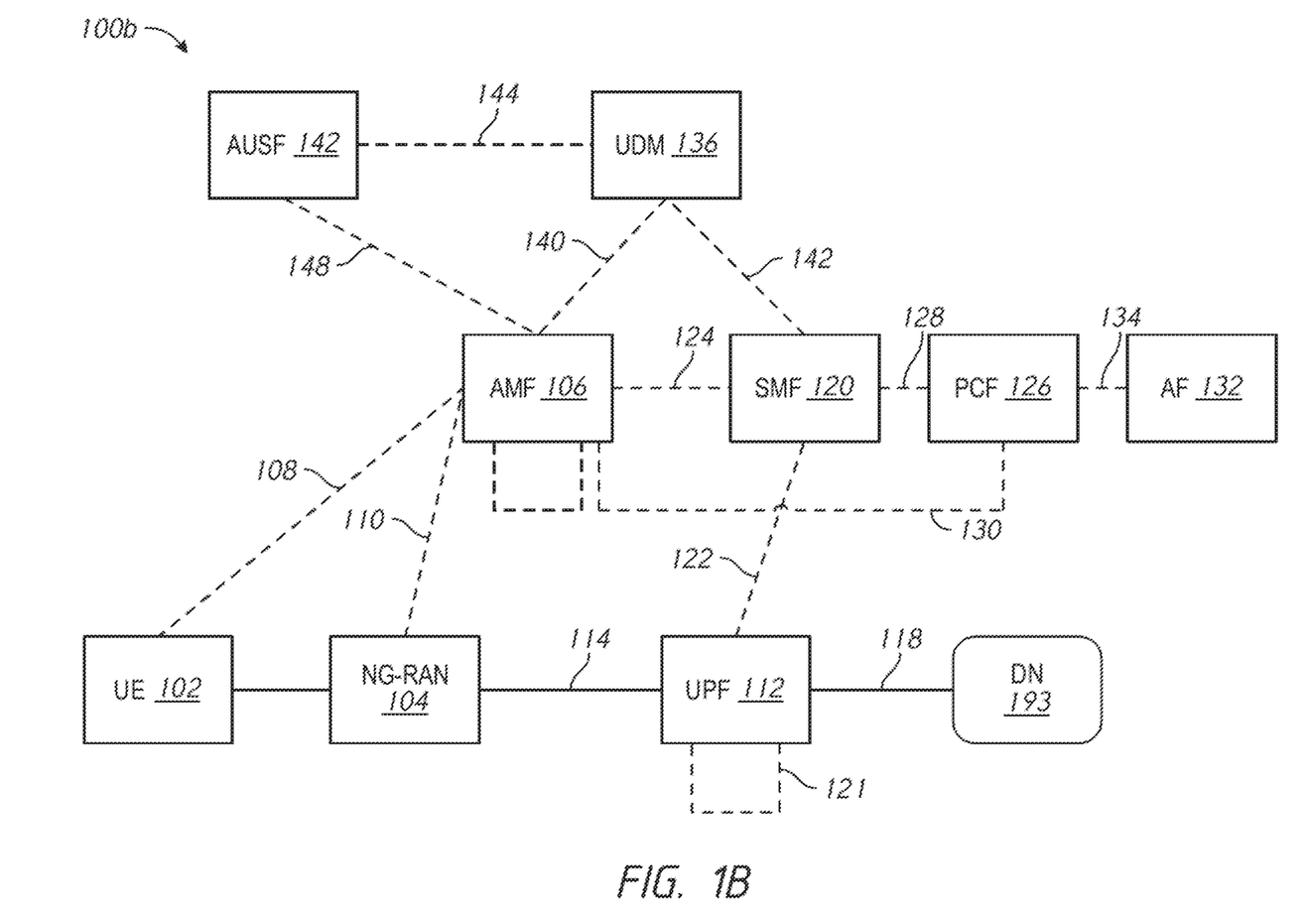
FIG. 1B is a diagram that illustrates an example network architecture of a 5G mobile network in accordance with some embodiments.

FIG. 1B illustrates an example network architecture 100b of a 5G mobile network in accordance with some embodiments. While pertinent features are shown, those of ordinary skill in the art will appreciate from the present disclosure that various other features have not been illustrated for the sake of brevity and so as not to obscure more pertinent aspects of the example implementations disclosed herein. To that end, the network architecture 100b includes the NG-RAN 104, an AMF 106, a session management function (SMF) 120, a policy control function (PCF) 126, and a user plane function (UPF) 112. A plurality of interfaces N1 108, N2 110, N3 114, N4 122, N5 134, N6 118, N7 128, N8 140, N9 121, N10 142, N11 124, N12 148, and N13 144 of network architecture 100a for 5G define the interfaces and/or protocols between each of the entities, as described in the relevant (evolving) standards documents for 5G (e.g., 3rd generation partnership project (3GPP) specification 23.501 and 3GPP specification 23.502).

The UE 102 may gain access to the 5G mobile network via NG-RAN 104, which includes a at least one base station (e.g., gNodeB). The UE 102 may correspond to any suitable type of device, such as a cellular phone, a smart phone, a tablet device, an IoT device, and an M2M device, or the like.

Communication with nodes or devices on one or more data networks such as the Internet, the 5GC 192, or other external networks, may be provided via the UPF 112. The UE device 102 and the NG-RAN 104 may communicate with the AMF 105 using the N1 interface 108 and the N2 interface 110, respectively. The AMF 106 may provide mobility management, access authentication and/or authorization, and/or a security anchor function. The AMF 106 may also provide security context management. The AMF 106 may provide a transparent proxy for routing access authentication messages. The AMF 106 may provide an interface for lawful intercept functions.

The NG-RAN 104 may communicate with the UPF 112 using the N3 interface 114. The UPF 112 may be responsible for packet routing and forwarding, packet inspection and policy rule enforcement, and traffic accounting and reporting. The UPF 112 may perform quality-of-service (QoS) handling for the user plane (sometimes also referred to as the "data plane"). The UPF 112 may provide an interface for lawful intercept functions for the user plane. The UPF 112 may provide an anchor point for intra-radio access technology (RAT) or inter-RAT mobility, e.g., when applicable. The UPF 112 may support interaction with an external Data Network (DN) 193 for transport of signaling for protocol data unit (PDU) session authentication and/or authorization by an external data network. The UPF 112 may communicate with the 5GC 192 using the N6 interface 118.

The UPF 112 may communicate with the SMF 120 using the N4 interface 122. The SMF 120 may support Internet protocol (IP) address allocation and management for the UE 102 (among a plurality of UEs), which may include authorization. The SMF 120 may support lawful intercept function. The SMF 120 may support selection and control of user plane functions. The SMF 120 may support termination of interfaces toward policy control and charging functions. The SMF 120 may support other functions related to session management. The SMF 120 may communicate with the AMF 106 using an N11 interface 124.

The PCF 126 may provide a unified policy framework to govern network behavior. The PCF 126 may provide policy rules to control plane functions that may enforce the policy rules. The PCF 126 may communicate with the SMF 120 using the N7 interface 128. The PCF 126 may communicate with the AMF 106 using the N15 interface 130. The PCF 126 may communicate with an application function (AF) 132 (e.g., IMS) using an N5 interface 134. The AF 132 may request dynamic policies and/or charging control.

The UDM 136 may support an authentication credential repository and processing function. This function may store long-term security credentials that may be used in authentication. The UDM 136 may store subscription information for a plurality of users and link each of the plurality of users to user device (e.g., UEs) based on their subscriber identity modules (SIMs) or international mobile equipment identities (IMEIs). For example, the UDM 136 may store subscription information relating to the users using the UE devices. This subscription information may include the type of user subscription such a normal offering or a premium offering. The subscription information may also include preferences for a per-type call basis such as an emergency voice call or a normal voice call. The UDM 136 may communicate with the AMF 106 using the N8 interface 140. The UDM 136 may communicate with the SMF 120 using the N10 interface 142. The UDM 136 may communicate with an authentication server function (AUSF) 142 using the N13 interface 144.

Figure 1C:
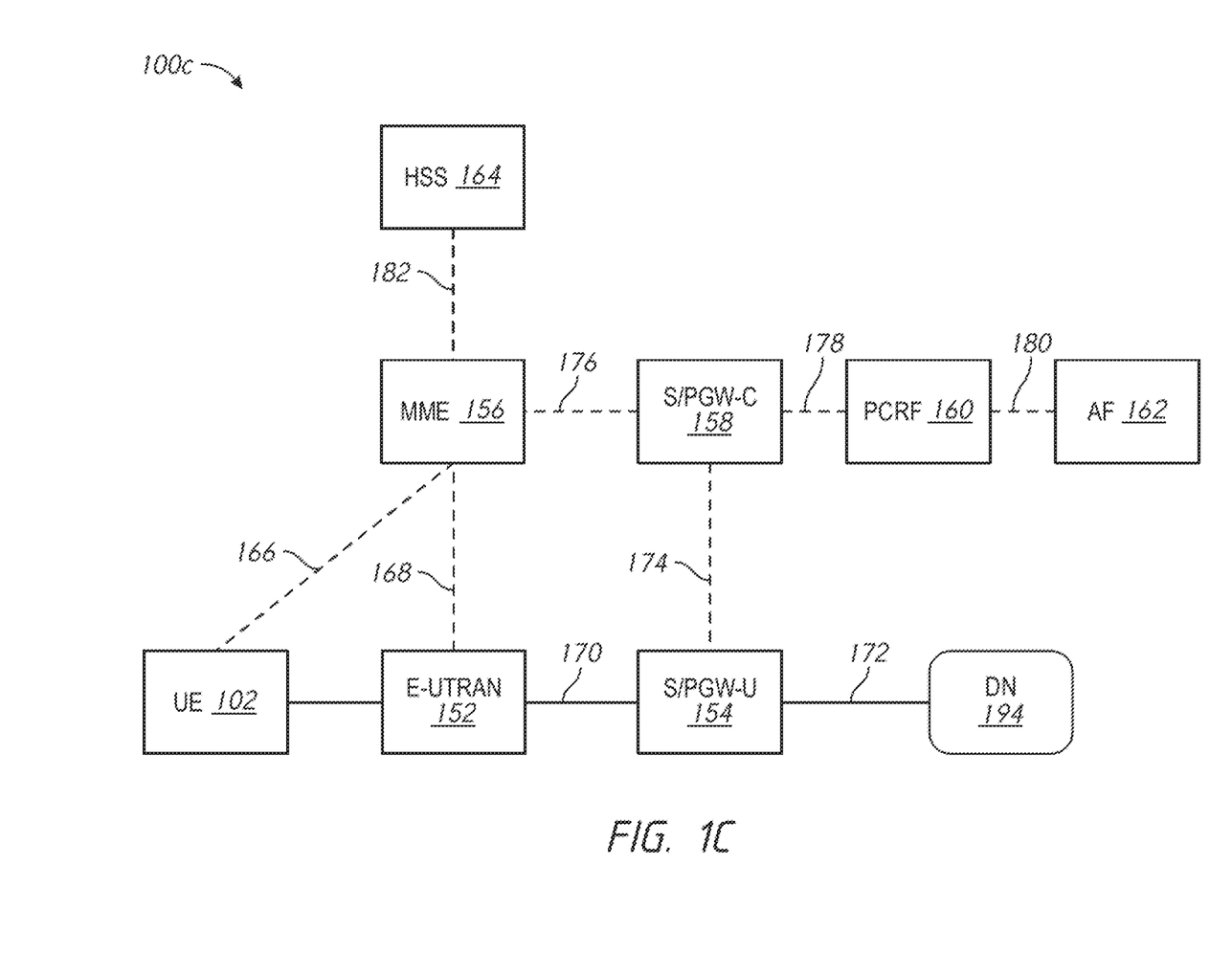
FIG. 1C is a diagram that illustrates an example network architecture of a LTE/4G mobile network in accordance with some embodiments.

FIG. 1C illustrates an example network architecture 100c of an LTE/4G mobile network in accordance with some embodiments. While pertinent features are shown, those of ordinary skill in the art will appreciate from the present disclosure that various other features have not been illustrated for the sake of brevity and so as not to obscure more pertinent aspects of the example implementations disclosed herein. To that end, the network architecture 100c includes the E-UTRAN 152, a MME 156, a serving/packet data network (PDN) gateway-control plane entity (S/PGW-C) 158, a S/PGW-user plane entity (S/PGW-U) 154, a policy and charging rules function (PCRF) 160, an AF 162, and an HSS 164. A plurality of interfaces NAS 166, S1-MME 168, S1-U 170, SGi 172, Sx 174, S11 176, Gx 178, Rx 180, and S6a 182 of network architecture 100c for LTE/4G define the interfaces and/or protocols between each of the entities, as described in the relevant standards documents for LTE/4G.

The UE 102 may gain access to the mobile network via the E-UTRAN 152, which may include at least one base station, such as an eNodeB. As mentioned above, the UE 102 may correspond to any suitable type of device, such as a cellular phone, a smart phone, a tablet device, an IoT device, and an M2M device, or the like.

Communications with nodes or devices on one or more data networks, such as an external DN 194, may be provided by the S/PGW-U 154 using the SGi 172 interface. The UE device 102 and the E-UTRAN 152 may communicate with the MME 156 using the NAS interface 166 and the S1-MME interface 168, respectively. The MME 156 is responsible for initiating paging and authentication of the UE device 102. The MME 156 may also retain location information at the tracking area level for each user and then selects an appropriate gateway during the initiate registration process. The MME 156 also plays a role in handover signaling between LTE/4G and 5G networks as well as LTE/4G and 2G/3G networks. The MME 156 may communicate with the HSS 164 using the S6a 182.

The E-UTRAN 152 may communicate with the S/PGW-U 154 using the S1-U interface 170. The S/PGW-U 154 provides access from the external DN 194. The S/PGW-U 164 may also act as an IP router with support for mobile specific tunneling and signaling protocols. The S/PGW-U 154 may communicate with the S/PGW-C 158 using the Sx interface 174.

The S/PGW-C 158 functions as an IP router with General Packet Radio Services tunneling protocol (GTP) support and charging functionality. The S/PGW-C 158 may act as an interface module for signaling between the S/PGW-U 154 and MME 156. The S/PGW-C 158 receives instructions from MME 156 via S11 interface 176 to set up and tear down sessions for the UE 102. The S/PGW-C 158 may communicate with the PCRF 160 via the Gx interface 178.

The PCRF 160 supports service data flow detection, policy enforcement, and flow-based charging. The PCRF 160 may manage network and subscriber policy in real time. The PCRF 160 may efficiently and dynamically route and prioritize network traffic. The PCRF 160 may also provide a unified view of subscriber context based on a combination of device, network, location, and billing data. The PCRF 160 may communicate with the S/PGW-C 158 using a Gx 178 interface. The PCRF 160 may communicate with the AF 162 (e.g., IMS) using an Rx 180 interface. The AF 162 may request dynamic policies and/or charging control.

The HSS 164 is a concatenation of the Home Subscriber Services (HSS) and the Authentication Center (AuC). The HSS portion of the HSS 164 manages the storing and updating of the database containing all the user subscription information including at least user identification and addressing and user profile information. The AuC portion of the HSS 164 manages the generation of security information from user identity keys. The HSS 164 may communicate with the MME 156 via the S6A 182.

Figure 2:
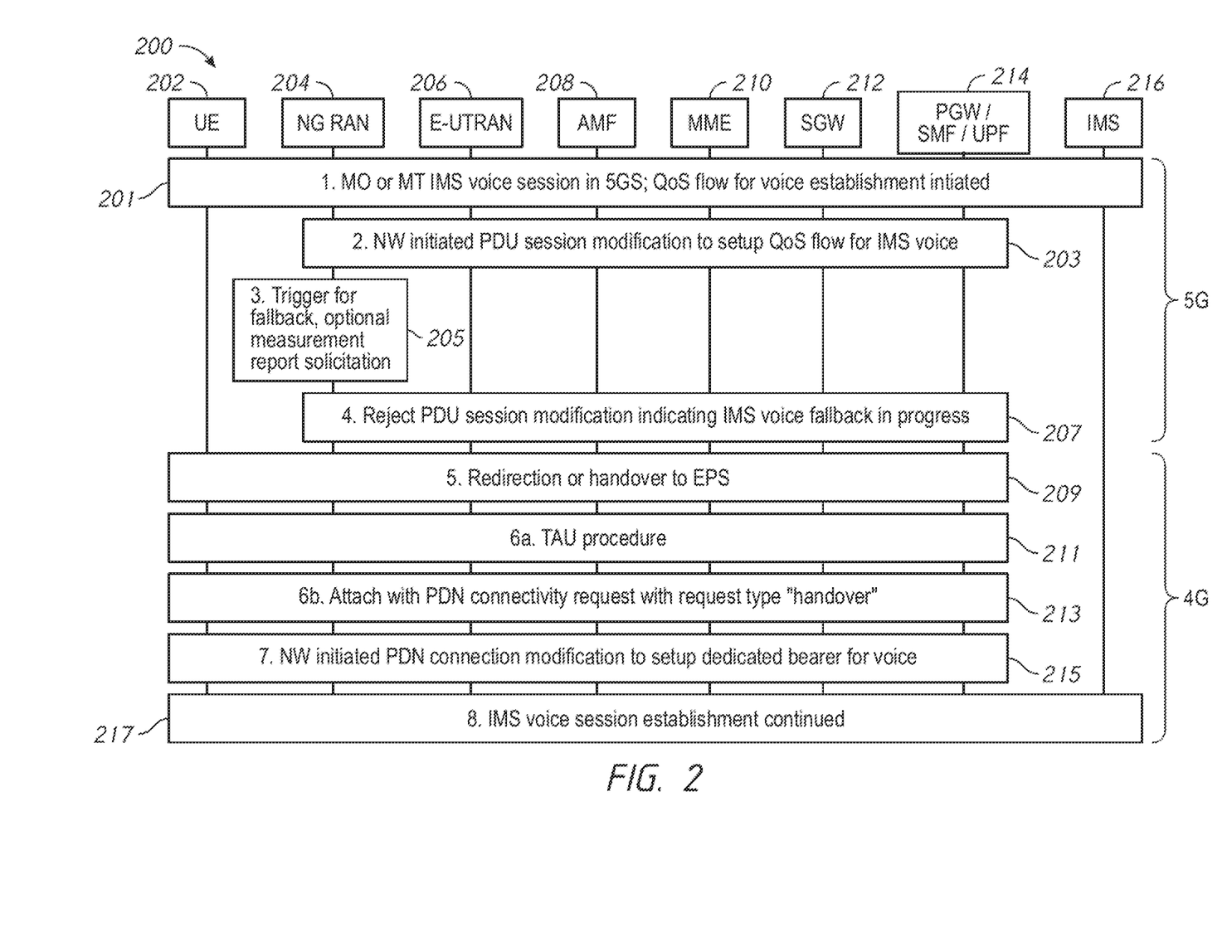
FIG. 2 is a process flow diagram that illustrates performing an "all or nothing" EPS fallback for IMS voice in accordance with some embodiments.

FIG. 2 depicts a process flow 200 implemented by a system for performing an "all or nothing" EPS fallback for IMS voice in accordance with some embodiments. As an option, one or more instances of the process flow 200 or any aspect thereof may be implemented in the context of the architecture and functionality of the embodiments described herein. Also, the process flow 200 or any aspect thereof may be implemented in any desired environment. In some embodiments, a UE 202, an NG-RAN 204, an E-UTRAN 206, an AMF 208, an MME 210, a serving gateway (SGW) 212, a packet data gateway (PGW)/SMF/UPF 214, and an IMS 216 exhibit a set of high-level interactions (e.g., operations, messages, etc.) as shown in the process flow 200 in FIG. 2.

In some embodiments, the system performs an "all or nothing" EPS fallback for IMS voice for the UE 202 that is served by a 5G system based on a configuration in the NG-RAN 204. As such, either all voice calls or no voice calls are subject to EPS fallback based on the NG-RAN 204 configuration. For example, a particular NG-RAN in a network can be configured to have EPS Fallback, which would subject all voice calls handled in this particular NG-RAN to EPS Fallback. On the other hand, another NG-RAN in the same network may be configured to not have EPS Fallback, which would subject all voice calls handled in this NG-RAN to continue in 5G Core without being subject to EPS Fallback.

When the UE 202 is served by the 5G system, the UE 202 has one or more ongoing PDU sessions that each include one or more QoS flows. In some embodiments, when the UE 202 registers with the 5G system, the 5G system, based on its network capability, sends an indication towards the UE 202 that IMS voice is supported.

In some embodiments, as represented by operation 201, a user will receive or make a voice call from the UE 202. In some embodiments, the UE 202 is situated on NG-RAN 204 in the 5G system, and a mobile originated (MO) or mobile terminated messaging (MT) IMS voice session establishment is initiated. An MO message corresponds to a message that a user sends into the system from a mobile device. An MT message corresponds to a message that is terminated on the mobile phone.

In some embodiments, as represented by operation 203, a network initiated PDU session modification reaches the NG-RAN 204 to setup a QoS flow for IMS voice. Here, the network allocates resources for the IMS voice call on the NG-RAN 204.

In some embodiments, as represented by operation 205, the UE 202 is connected to the NG-RAN 204 over the network. Now, when the NG-RAN 204 needs to allocate resources for the IMS voice call, the NG-RAN 204 will trigger a fallback mechanism which hands over the call to the LTE/4G network associated with the E-UTRAN 206 because the setup will be rejected by the NG-RAN 204. In contrast to the process flow 300 in FIG. 3, the process flow 400 in FIG. 4, and the process flow 500 in FIG. 5, the NG-RAN 204 is not provisioned to any one subscriber. Instead, the NG-RAN 204 will hand over the call to the LTE/4G network during the call establishment. As such, the same handling will be applied for all calls handled in the NG-RAN 204 irrespective of a user such that it is an "all or nothing" approach.

In some embodiments, the NG-RAN 204 is configured to support EPS fallback for IMS voice and decides to trigger fallback to EPS by considering the network configuration, and/or conditions within the NG-RAN 204. If the NG-RAN 204 decides not to trigger a fallback to EPS, then the process flow 200 stops. In some embodiments, the NG-RAN 204 may initiate a measurement report solicitation from the UE 202 including the E-UTRAN 206 as a target.

In some embodiments, as represented by operation 207, the NG-RAN 204 responds with a message that indicates rejection of the PDU Session modification to setup QoS flow for IMS voice. In some embodiments, the message is sent towards the SMF/PGW/UPF 214 with an indication that mobility due to a fallback for IMS voice is ongoing.

In some embodiments, as represented by operation 209, the NG-RAN 204 initiates a handover or an inter-system redirection to EPS (e.g., the LTE/4G network associated with the E-UTRAN 206).

In some embodiments, as represented by operation 211, in the case of 5G to EPS handover and also in the case of the inter-system redirection to EPS, the UE 202 initiates a tracking area update (TAU) procedure.

In some embodiments, as represented by operation 213, if the UE 202 initiates an attach with PDN connectivity request with a request type "handover."

In some embodiments, as represented by operation 215, the SMF/PGW/UPF 214 re-initiates the setup of the dedicated bearer for IMS voice after completion of the mobility procedure to EPS. This is the same bearer that was attempted to be established over NG-RAN 204, but was rejected in operation 207.

In some embodiments, as represented by operation 217, the IMS voice session establishment continues over the E-UTRAN 206.

Although the process flow 200 is described specifically in reference to the UE 202 on a 5G network that "falls back" to an LTE/4G network, those of ordinary skill in the art will appreciate from the present disclosure that the process flow 200 mimics a CS fallback for voice that was introduced to steer voice calls to a 2G/3G network when LTE/4G was first introduced.

Figure 3:
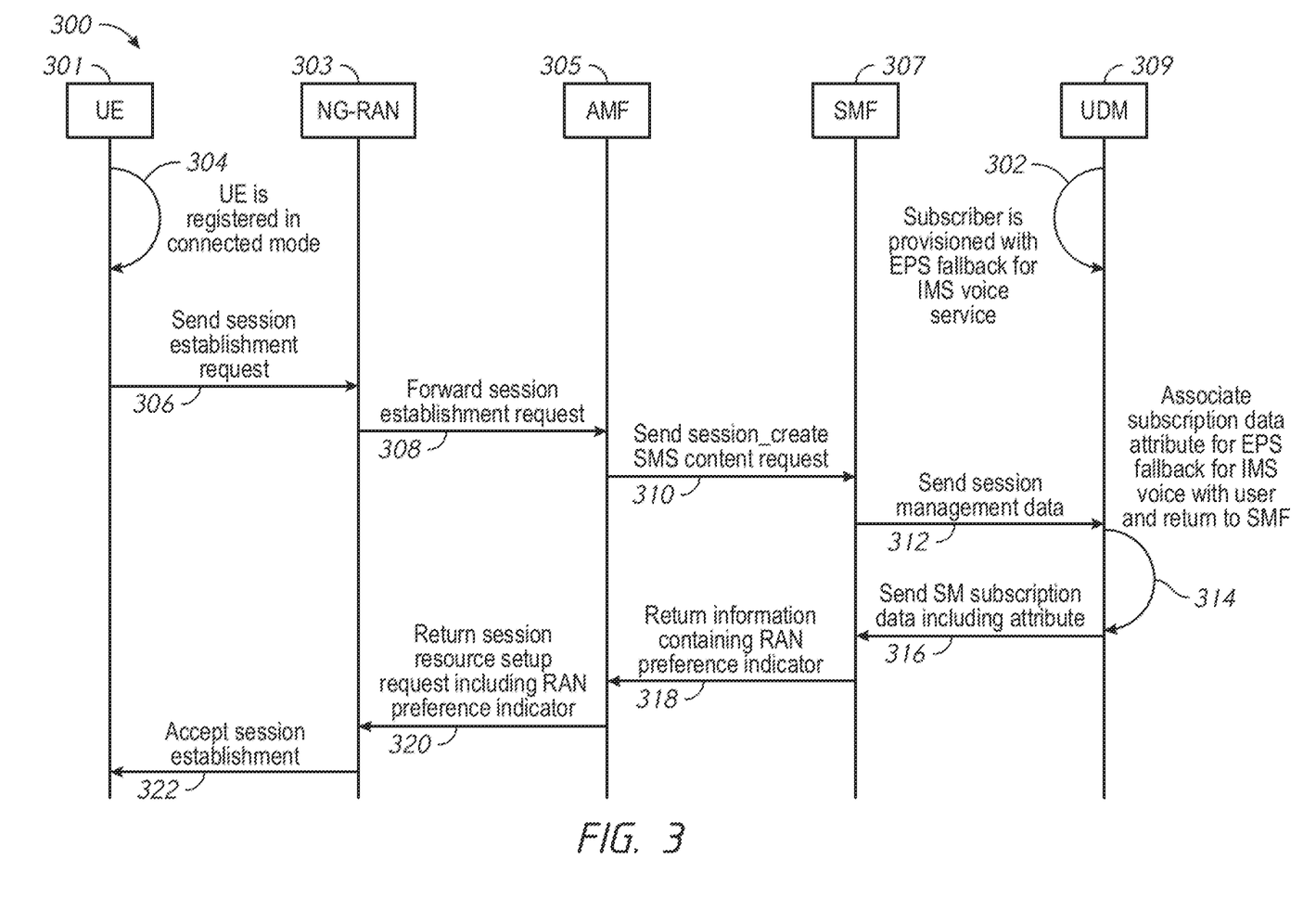
FIG. 3 is a process flow diagram that illustrates performing a session setup phase for selective EPS fallback for IMS voice in accordance with some embodiments.

FIG. 3 depicts a process flow 300 implemented by a system for performing a registration phase for selective EPS fallback for IMS voice in accordance with some embodiments. As an option, one or more instances of the process flow 300 or any aspect thereof may be implemented in the context of the architecture and functionality of the embodiments described herein. Also, the process flow 300 or any aspect thereof may be implemented in any desired environment. In some embodiments, a UE 301, an NG-RAN 303, an AMF 305, an SMF 307, and a UDM 309 (or operator) exhibit a set of high-level interactions (e.g., operations, messages, etc.) as shown in the process flow 300 in FIG. 3.

In some embodiments, as represented by operation 302, the UDM 309 (or operator) provisions a subscriber with an "EPS Fallback for IMS voice" feature. In some embodiments, when the UE 301 powers on, the AMF 305 receives information about whether the UE 301 is allowed to access this network. In some embodiments, the operator provisioning system is updated with new subscription information into a user database. Through the operator's provisioning system, the UDM 309 will know if a user's voice call (or other specified data flow type) will be handled via a first RAN (e.g., a 5G network) or a second RAN (e.g., an LTE/4G network) based on the user subscription information. For example, the user subscription information indicates enabling EPS fallback on a data flow type basis (e.g., IMS voice) or the like.

In some embodiments, as represented by operation 304, the UE 301 is registered in a "CONNECTED" mode.

In some embodiments, as represented by operation 306, after the UE 301 is set up and obtains access to the network, the UE 301 sends a session establishment request to the NG-RAN 303. In some embodiments, the request corresponds to a PDU session establishment request. In some embodiments, the session establishment request may correspond to an IMS PDU setup for normal voice calls or an Emergency PDU session setup for emergency calls.

In some embodiments, as represented by operation 308, the NG-RAN 303 forwards the session establishment request to the AMF 305.

In some embodiments, as represented by operation 310, the AMF 305 then sends the session establishment request to the SMF 307. In some embodiments, the session establishment request corresponds to a session content request to the SMF 307.

In some embodiments, as represented by operation 312, the SMF 307 sends session management data to the UDM 309. In some embodiments, the session management data corresponds to subscription data for the UE 301. In some embodiments, the SMF 307 will obtain information such as what kind of session attributes a user has, what the user is subscribed to, and the like and send that information to the UDM 309. At this point, the UDM 309 knows if the user's call (or data flow) will be handled via a first RAN or a second RAN based on the user subscription and session management data.

In some embodiments, as represented by operation 314, the UDM 309 associates subscription data attributes for EPS fallback for IMS voice with the user. In some embodiments, the subscription data attribute corresponds to a boolean attribute associated with a user or n-tuple vector characterizing a plurality of attributes associated with the user. In some embodiments, the subscriber profile in the UDM 309 will contain information regarding EPS fallback for IMS voice. In some embodiments, the user has the ability to activate and/or deactivate this feature in his profile on a per call basis or per data flow type, which allows the user to choose which calls or data flows are to be handled via the first RAN (e.g., the 5G network) or via the second RAN (e.g., the LTE/4G network). For example, the user may decide that normal voice calls will be handled by the first RAN while emergency calls will be handled by the second RAN.

In some embodiments, as represented by operation 316, the UDM 309 sends the session management data including the subscription data attribute to the SMF 307.

In some embodiments, as represented by operation 318, the SMF 307 returns information including a RAN preference indicator to the AMF 305. In some embodiments, the RAN preference indicator includes the subscription data attribute.

In some embodiments, as represented by operation 320, the AMF 305 returns a resource setup request including the RAN preference indicator to the NG RAN 303. In some embodiments, the session resource setup request corresponds to a PDU session resource setup request. In some embodiments, the RAN preference indicator includes the EPS fallback for IMS Voice subscription information. At this point, the NG-RAN 303 determines whether EPS fallback for IMS voice is applicable or not. In some embodiments, during the IMS/Emergency Voice bearer the NG-RAN 303 will determine whether or not EPS fallback is to be triggered based on EPS Fallback for IMS Voice attribute received during the IMS/Emergency PDU session establishment procedure.

In some embodiments, as represented by operation 322, the NG-RAN 303 accepts the session establishment. In some embodiments, the session establishment corresponds to a PDU session establishment request that was sent in operation 306.

Figure 4:
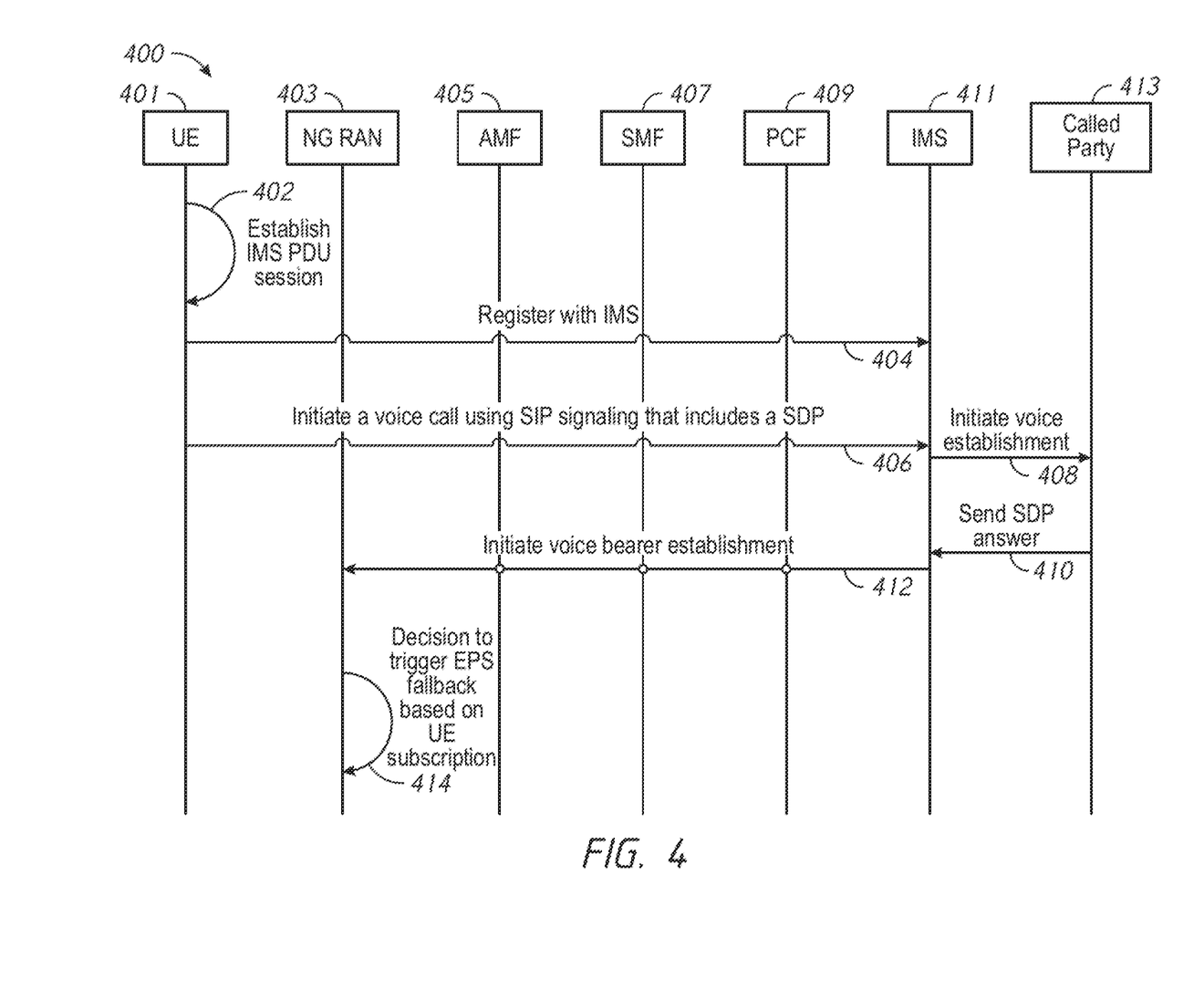
FIG. 4 is a process flow diagram that illustrates making a call a selective EPS fallback for IMS voice in accordance with some embodiments.

FIG. 4 depicts a process flow 400 implemented by a system for making a call with a selective EPS fallback for IMS voice accordance with some embodiments. As an option, one or more instances of the process flow 400 or any aspect thereof may be implemented in the context of the architecture and functionality of the embodiments described herein. Also, the process flow 400 or any aspect thereof may be implemented in any desired environment. In some embodiments, a UE 401, an NG-RAN 403, an AMF 405, an SMF 407, a PCF 409, an IMS 411, and a called party 413 exhibit a set of high-level interactions (e.g., operations, messages, etc.) as shown in the process flow 400 in FIG. 4.

In some embodiments, as represented by operation 402, an IMS PDU session is established by the UE 401 such that the NG-RAN 403 knows whether or not to trigger EPS fallback for the session and/or user.

In some embodiments, as represented by operation 404, the UE 401 registers with IMS 411. In some embodiments, the UE 401 registers with IMS 411 using session initiation protocol (SIP) signaling.

In some embodiments, as represented by operation 406, the UE 401 initiates a voice call (e.g., QCI/5QI=1) that includes a session description protocol (SDP) offer using SIP signaling.

In some embodiments, as represented by operation 408, the IMS 411 initiates a voice establishment with the called party 413.

In some embodiments, as represented by operation 410, the IMS 411 receives a session description protocol (SDP) answer from the called party 413.

In some embodiments, as represented by operation 412, the IMS 411 initiates a voice bearer establishment (e.g., PDU session modification) for QCI/5Q1=1 through the PCF 409, the SMF 407, AMF 405, and the NG-RAN 405. Specifically, the IMS 411 requests the PCF 409 to set up the bearer for voice (5QI=1). Next, the PCF 409 triggers SMF 407 to setup voice bearer, which goes to NG-RAN 405 via AMF 405.

In some embodiments, as represented by operation 414, the NG-RAN 403 takes an appropriate action for EPS fallback depending on whether or not IMS voice sessions associated with the UE 401 are subject to EPS fallback.

Figure 5:
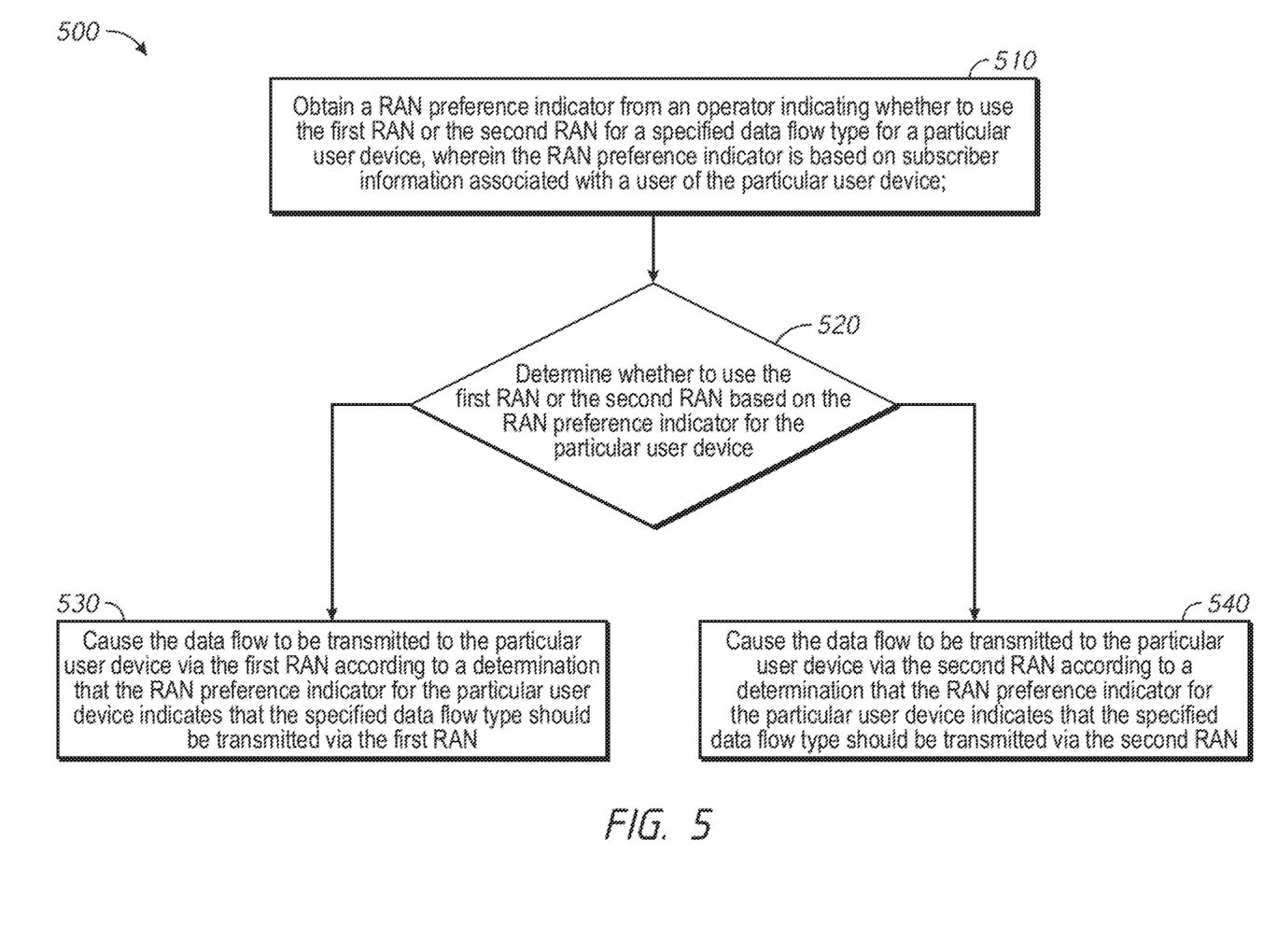
FIG. 5 is a flow representation of a method of determining whether to use a first RAN or a second RAN for a data flow associated with a user in accordance with some embodiments.

FIG. 5 is a flowchart representation of a method 500 of determining whether to use a first RAN or a second RAN for a data flow associated with a user based on user subscription information in accordance with some embodiments. In some embodiments, the method 500 is performed by a node, including one or more processors and a non-transitory memory, of a first radio-access-network (RAN) servicing a plurality of user devices, wherein the first RAN is associated with a first radio access technology (RAT) (e.g., 5G). In some embodiments, the plurality of user devices is also serviced by a second RAN (e.g., the E-UTRAN 152 in FIG. 1A) associated with a second RAT (e.g., LTE/4G). In some embodiments, the method 500 is performed by processing logic, including hardware, firmware, software, or a combination thereof. In some embodiments, the method 500 is performed by a processor executing code stored in non-transitory computer-readable medium (e.g., a memory). In some embodiments, a set of computer readable instructions, which are executed at the node, implement the method 500.

To that end, as represented by block 510, the method 500 includes obtaining a RAN preference indicator from an operator (e.g., a UDM 136 in FIGS. 1A and 1B) indicating whether to use the first RAN or the second RAN for a specified data flow for a particular user device, wherein the RAN preference indicator is based on subscriber information associated with a user of the particular user device. In some embodiments, the first RAN operates according to the 5G RAT, and the second RAN operates according to the LTE/4G RAT. In some embodiments, the RAN preference indicator corresponds to an EPS fallback indication, and the specified data flow type corresponds to IMS voice.

In some embodiments, the method 500 includes obtaining a data flow that corresponds to a specified data flow type for a particular user device. In some embodiments, the method 500 also includes identifying the RAN preference indicator for the particular user device by matching identifier information in the data flow (e.g., SIM or IMEI information) to the RAN preference indicator for the particular user device. In some embodiments, the RAN preference indicator is indexed based on identifier information (e.g., SIM or IMEI information).

To that end, as represented by block 520, the method 500 includes determining whether to transmit the data flow that corresponds to the specified data flow type for the particular user device via the first RAN or the second RAN based on the RAN preference indicator for the particular user device. For example, during IMS/Emergency voice bearer setup, the radio node will determine whether or not EPS fallback is to be triggered based on the EPS fallback for IMS voice attribute that was received during the setup phase. In some implementations, a user subscription information can be on a per call basis, a call-type basis (e.g., an emergency call v. a normal voice call), or a per user group basis.

To that end, according to a determination that the first RAN is to be used then, as represented by block 530, the method 500 includes causing the data flow to be transmitted to the particular user device via the first RAN according to a determination that the RAN preference indicator for the particular user device indicates that the specified data flow type should be transmitted via the first RAN. For example, the node of the first RAN (e.g., the NG-RAN 104 in FIGS. 1A and 1B) does not trigger EPS fallback to the second RAN (e.g., the E-UTRAN 152 in FIGS. 1A and 1C) based on the RAN preference indicator and services the data flow in the first RAN.

To that end, according to a determination that the second RAN is to be used then, as represented by block 540, the method 500 includes causing the data flow to be transmitted to the particular user device via the second RAN according to a determination that the RAN preference indicator for the particular user device indicates that the specified data flow type should be transmitted via the second RAN. For example, the node of the first RAN (e.g., the NG-RAN 104 in FIGS. 1A and 1B) triggers EPS fallback to the second RAN (e.g., the E-UTRAN 152 in FIGS. 1A and 1C) based on the RAN preference indicator, and the data flow is serviced by the second RAN.

Figure 6:
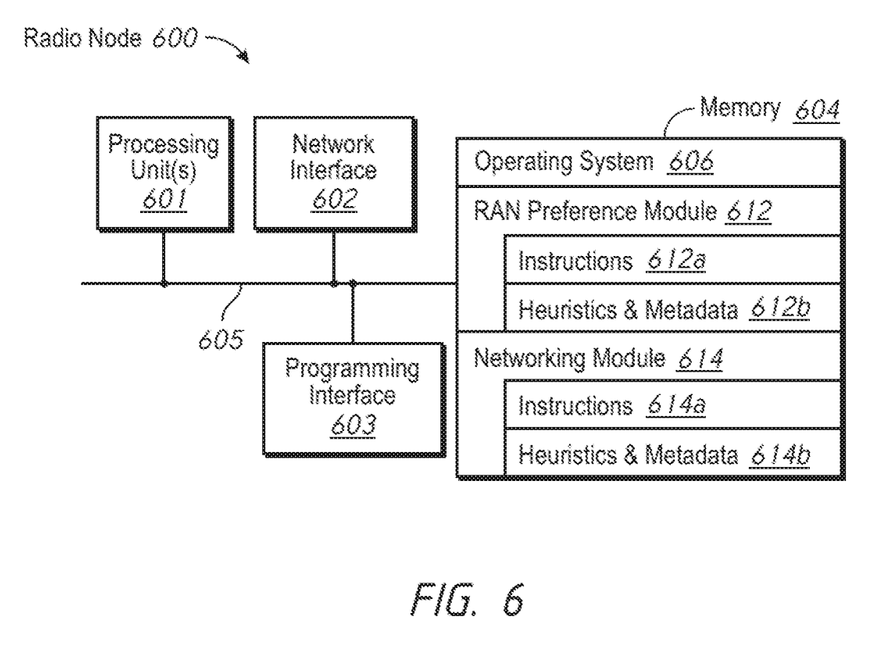
FIG. 6 is a schematic block diagram of an example radio node in accordance with some embodiments.

FIG. 6 is a block diagram of a radio node 600 enabled with one or more components of a device in accordance with some embodiments. For example, the radio node 600 corresponds to a management function of the NG-RAN 104 in FIG. 1B and/or the E-UTRAN 152 in FIG. 1C. While certain specific features are illustrated, those of ordinary skill in the art will appreciate from the present disclosure that various other features have not been illustrated for the sake of brevity, and so as not to obscure more pertinent aspects of the embodiments disclosed herein. To that end, as a non-limiting example, in some embodiments the radio node 600 includes one or more processing units 601, a network interface 602, a programming interface 603, a memory 604, and one or more communication buses 605 for interconnecting these and various other components.

In some embodiments, the one or more communication buses 605 include circuitry that interconnects and controls communications between system components. The memory 604 includes high-speed random-access memory, such as DRAM, SRAM, DDR, RAM, or other random-access solid-state memory devices, and may include non-volatile memory, such as one or more magnetic disk storage devices, optical disk storage devices, flash memory devices, or other non-volatile solid-state storage devices. The memory 604 optionally includes one or more storage devices remotely located from the one or more processing units 601. The memory 604 comprises a non-transitory computer readable storage medium.

In some embodiments, the memory 604 or the non-transitory computer readable storage medium of the memory 604 stores the following programs, modules, and data structures, or a subset thereof including an optional operating system 606, a RAN preference module 612, and a networking module 614. The operating system 606 includes procedures for handling various basic system services and for performing hardware dependent tasks.

In some embodiments, the RAN preference module 612 is configured to store the RAN preference indicator in a datastore (e.g., local or remote relative to the radio node 600). In some embodiments, the RAN preference module 612 is configured to determine whether to route information or data flows associated with a respective user to a first RAN or a second RAN based on the RAN preference indicator associated with the respective user. To that end, in various embodiments, the RAN preference module 612 includes a set of instructions and/or logic 612*a*, and heuristics and metadata 612*b*.

In some embodiments, the networking module 614 is configured to route information or data flows between a network (e.g., the NG-RAN 104 in FIGS. 1A and 1B or the E-UTRAN 152 in FIGS. 1A and 1C) and the number of user devices (e.g., including the UE 102 in FIGS. 1A-1C). To that end, the networking module 614 includes a set of instructions and/or logic 614*a*, and heuristics and metadata 614*b*.

Although the RAN preference module 612 and the networking module 614 are illustrated as residing on a radio node 600, it should be understood that in other embodiments, any combination of the RAN preference module 612 and the networking module 614 may reside on a separate computing device.

Moreover, FIG. 6 is intended more as functional description of the various features which may be present in a particular embodiment as opposed to a structural schematic of the embodiments described herein. As recognized by those of ordinary skill in the art, items shown separately could be combined and some items could be separated. For example, some functional modules shown separately in FIG. 6 could be implemented in a single module and the various functions of single functional blocks could be implemented by one or more functional blocks in various embodiments. The actual number of modules and the division of particular functions and how features are allocated among them will vary from one embodiment to another and, in some embodiments, may depend in part on the particular combination of hardware, software, and/or firmware chosen for a particular embodiment.

Various aspects of embodiments within the scope of the appended claims are described above. It should be apparent that the various features of embodiments described above may be embodied in a wide variety of forms and that any specific structure and/or function described above is merely illustrative. Based on the present disclosure, one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first", "second", etc. may be used herein to describe various elements, these elements should not be limited by these terms. These terms are only used to distinguish one element from another. For example, a first RAN could be termed a second RAN, and, similarly, a second RAN could be termed a first RAN, which changing the meaning of the description, so long as all occurrences of the "first RAN" are renamed consistently and all occurrences of the "second RAN" are renamed consistently. The first RAN and the second RAN are both RANs, but they are not the same RAN.

The terminology used herein is for the purpose of describing particular embodiments only and is not intended to be limiting of the claims. As used in the description of the embodiments and the appended claims, the singular forms "a", "an", and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:

1. A method comprising:
   at a node of a first radio-access-network (RAN) servicing a plurality of user devices, wherein the first RAN is associated with a first radio access technology (RAT), and wherein the node includes one or more processors and a non-transitory memory:
   obtaining a RAN preference indicator from an operator indicating whether to use the first RAN or a second RAN associated with a second RAT for a specified data flow type for a particular user device, wherein the RAN preference indicator is based on subscriber information associated with a user of the particular user device;
   determining whether to transmit the data flow that corresponds to the specified data flow type for the particular user device via the first RAN or the second RAN based on the RAN preference indicator for the particular user device;
   causing the data flow to be transmitted to the particular user device via the first RAN according to a determination that the RAN preference indicator for the particular user device indicates that the specified data flow type should be transmitted via the first RAN; and
   causing the data flow to be transmitted to the particular user device via the second RAN according to a determination that the RAN preference indicator for the particular user device indicates that the specified data flow type should be transmitted via the second RAN.

2. The method of claim 1, wherein a first RAT corresponds to long-term evolution (LTE)/4G radio technology and the second RAT corresponds to 5G radio technology.

3. The method of claim 1, wherein the first RAN corresponds to a premium network and the second RAN corresponds to a default network.

4. The method of claim 1, wherein the RAN preference indicator corresponds to an evolved packet system (EPS) fallback indicator.

5. The method of claim 1, wherein the RAN preference indicator corresponds a subscription tier indicator.

6. The method of claim 1, wherein the specified data flow type corresponds to IP multimedia subsystem (IMS) voice data traffic.

7. The method of claim 1, wherein the specified data flow type corresponds to emergency data traffic.

8. The method of claim 1 further comprising, foregoing using the second RAN for the data flow according to a determination that the second RAN should not be triggered based on the subscriber information.

9. The method of claim 1 further comprising:
   obtaining, during a setup phase, a request to register a user equipment with a voice call; and sending, during the setup phase, the request with the subscriber information to a 5G core,
   wherein the subscriber information is associated with a user and includes information about whether the second RAN for the voice call is to be performed by the user.

10. The method of claim 1, wherein the subscriber information corresponds to at least one of a per user group basis, a per call basis, and a per call type basis.

11. A device comprising: one or more processors;
    a non-transitory memory; and
    one or more programs stored in the non-transitory memory, which, when executed by the one or more processors, cause the device to:
    obtain a radio-access-network (RAN) preference indicator from an operator indicating whether to use the first RAN or a second RAN associated with a second radio access technology (RAT) for a specified data flow type for a particular user device, wherein the RAN preference indicator is based on subscriber information associated with a user of the particular user device;
    determine whether to transmit the data flow that corresponds to the specified data flow type for the particular user device via the first RAN or the second RAN based on the RAN preference indicator for the particular user device;
    cause the data flow to be transmitted to the particular user device via the first RAN according to a determination that the RAN preference indicator for the particular user device indicates that the specified data flow type should be transmitted via the first RAN; and cause the data flow to be transmitted to the particular user device via the second RAN according to a determination that the RAN preference indicator for the particular user device indicates that the specified data flow type should be transmitted via the second RAN.

12. The device of claim 11, wherein a first RAT corresponds to long-term evolution (LTE)/4G radio technology and the second RAT corresponds to 5G radio technology.

13. The device of claim 11, wherein the first RAN corresponds to a premium network and the second RAN corresponds to a default network.

14. The device of claim 11, wherein the RAN preference indicator corresponds to an evolved packet system (EPS) fallback indicator.

15. The device of claim 11, wherein the specified data flow type corresponds to IP multimedia subsystem (IMS) voice data traffic.

16. The device of claim 11, wherein the specified data flow type corresponds to emergency data traffic.

17. The device of claim 11, wherein the one or more programs, when executed by the one or more processors, cause the device to:

forego using the second RAN for the data flow according to a determination that the second RAN should not be triggered based on the subscriber information.

18. The device of claim 11, wherein the one or more programs, when executed by the one or more processors, cause the device to:

obtain, during a setup phase, a request to register a user equipment with a voice call; and send, during the setup phase, the request with the subscriber information to a 5G core, wherein the subscriber information is associated with a user and includes information about whether the second RAN for the voice call is to be performed by the user.

19. A non-transitory memory storing one or more programs, the one or more programs comprising instructions, which, when executed by one or more processors of a device, cause the device to:

obtain a radio-access-network (RAN) preference indicator from an operator indicating whether to use the first RAN or a second RAN associated with a second radio access technology (RAT) for a specified data flow type for a particular user device, wherein the RAN preference indicator is based on subscriber information associated with a user of the particular user device;

determine whether to transmit the data flow that corresponds to the specified data flow type for the particular user device via the first RAN or the second RAN based on the RAN preference indicator for the particular user device;

cause the data flow to be transmitted to the particular user device via the first RAN according to a determination that the RAN preference indicator for the particular user device indicates that the specified data flow type should be transmitted via the first RAN; and cause the data flow to be transmitted to the particular user device via the second RAN according to a determination that the RAN preference indicator for the particular user device indicates that the specified data flow type should be transmitted via the second RAN.

20. The non-transitory memory of claim 19, wherein a first RAT corresponds to long-term evolution (LTE)/4G radio technology and the second RAT corresponds to 5G radio technology.

* * * * *